United States Patent
Zhang et al.

(10) Patent No.: US 11,983,566 B2
(45) Date of Patent: May 14, 2024

(54) HARDWARE CIRCUIT FOR DEEP LEARNING TASK SCHEDULING

(71) Applicant: NVIDIA Corporation, Santa Clara, CA (US)

(72) Inventors: Yilin Zhang, Shanghai (CN); Geng Chen, Shanghai (CN); Yan Zhou, Shanghai (CN); Qifei Fan, Shanghai (CN); Prashant Gaikwad, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 353 days.

(21) Appl. No.: 17/374,361

(22) Filed: Jul. 13, 2021

(65) Prior Publication Data

US 2022/0382592 A1    Dec. 1, 2022

Related U.S. Application Data

(63) Continuation of application No. PCT/CN2021/095739, filed on May 25, 2021.

(51) Int. Cl.
    *G06F 9/50*         (2006.01)
    *G06F 9/48*         (2006.01)
    *G06N 3/063*       (2023.01)

(52) U.S. Cl.
    CPC .......... *G06F 9/5027* (2013.01); *G06F 9/4881* (2013.01); *G06N 3/063* (2013.01)

(58) Field of Classification Search
    None
    See application file for complete search history.

(56) References Cited

U.S. PATENT DOCUMENTS

| | | | |
|---|---|---|---|
| 10,949,736 B2 * | 3/2021 | Deisher | G06N 3/044 |
| 2018/0121796 A1 * | 5/2018 | Deisher | G10L 15/16 |
| 2018/0188997 A1 * | 7/2018 | Fleming, Jr. | G06F 9/3838 |

(Continued)

FOREIGN PATENT DOCUMENTS

| | | |
|---|---|---|
| CN | 107844833 A | 3/2018 |
| CN | 108256636 A | 7/2018 |

(Continued)

OTHER PUBLICATIONS

'Hardware Architectural Specification—NVDLA Documentation' by NVDLA.org, archived on Sep. 16, 2019. (Year: 2019).*

(Continued)

*Primary Examiner* — Steven G Snyder
(74) *Attorney, Agent, or Firm* — LOWENSTEIN SANDLER LLP

(57) ABSTRACT

Apparatuses, systems, and techniques for scheduling deep learning tasks in hardware are described. One accelerator circuit includes multiple fixed-function circuits that each processes a different layer type of a neural network. A scheduler circuit receives state information associated with a respective layer being processed by a respective fixed-function circuit and dependency information that indicates a layer dependency condition for the respective layer. The scheduler circuit determines that the layer dependency condition is satisfied using the state information and the dependency information and enables the fixed-function circuit to process the current layer at the respective fixed-function circuit.

23 Claims, 8 Drawing Sheets

(56) References Cited

U.S. PATENT DOCUMENTS

| | | | |
|---|---|---|---|
| 2019/0236436 A1* | 8/2019 | Imber | G06F 7/4836 |
| 2019/0236449 A1* | 8/2019 | Imber | G06N 3/08 |
| 2019/0391796 A1* | 12/2019 | Brady | G06F 8/458 |
| 2020/0357099 A1 | 11/2020 | Long et al. | |
| 2022/0374298 A1* | 11/2022 | Zhang | G06F 11/0724 |
| 2022/0413752 A1* | 12/2022 | Zhang | G06F 12/0875 |

FOREIGN PATENT DOCUMENTS

| | | | | |
|---|---|---|---|---|
| CN | 109409510 A | | 3/2019 | |
| GB | 2568081 A | * | 5/2019 | G06F 7/483 |
| GB | 2568082 A | * | 5/2019 | G06F 17/11 |

OTHER PUBLICATIONS

'Efficient Compilation and Mapping of Fixed Function Combinational Logic onto Digital Signal Processors Targeting Neural Network Inference and Utilizing High-level Synthesis' by Shahsavani et al., copyright 2023. (Year: 2023).*

'NullaNet Tiny: Ultra-low-latency DNN Inference Through Fixed-function Combinational Logic' by Nazemi et al., Apr. 2021. (Year: 2021).*

'Energy-Efficient, Low-Latency Realization of Neural Networks through Boolean Logic Minimization' by Nazemi et al., copyright 2019. (Year: 2019).*

Machine Translation of Japanese Patent Application JP 7179237 B1, filed 2022. (Year: 2022).*

Machine Translation of Chinese Patent Application CN 110941584 A, filed 2019. (Year: 2019).*

Machine Translation of Chinese Patent Application CN 110928833 A, filed 2019. (Year: 2019).*

Machine Translation of Chinese Patent Application CN 110766146 B, filed 2019. (Year: 2019).*

Machine Translation of Chinese Patent Application CN 110321998 B, filed 2018. (Year: 2018).*

International Search Report and Written Opinion for International Application No. PCT/CN2021/095739, dated Feb. 22, 2022, 7 Pages.

* cited by examiner

HARDWARE CIRCUIT FOR DEEP LEARNING TASK SCHEDULING

TECHNICAL FIELD

At least one embodiment pertains to processing resources used to perform and facilitate artificial intelligence. For example, at least one embodiment pertains to hardware circuits for deep learning task scheduling.

BACKGROUND

In many instances, the majority of computing effort for deep learning inference is based on mathematical operations that can generally be grouped into four parts: convolutions, activations, pooling, and normalization. These operations share a few characteristics that make them particularly well suited for hardware implementations: their memory access patterns are predictable and readily parallelized. But hardware implementations may suffer from inefficient scheduling of such operations leading to less than ideal performance of deep learning inference on such hardware. Hence, there is a need to address such and other deficiencies in such hardware.

DETAILED DESCRIPTION

Figure 1:
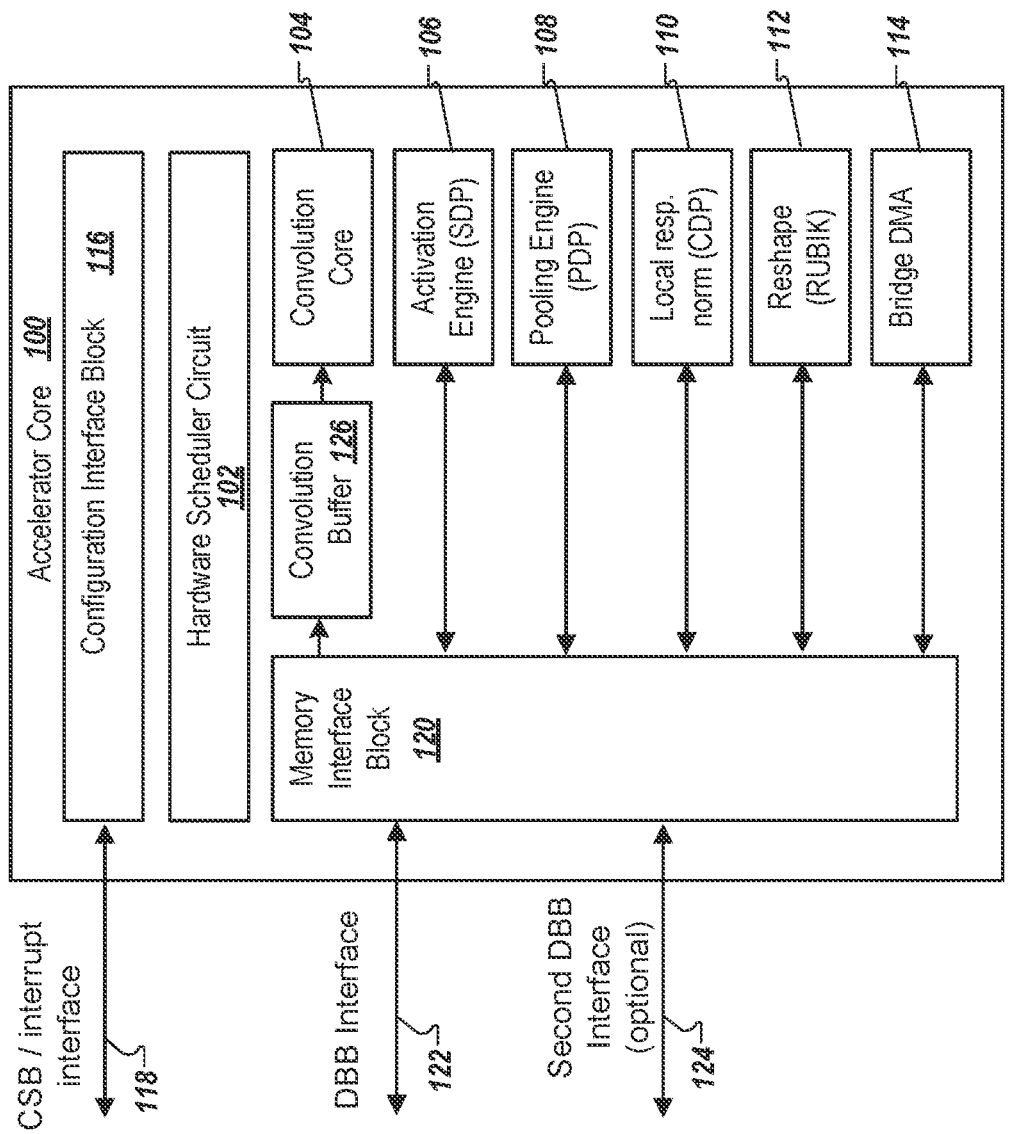
FIG. 1 is a block diagram of an accelerator core with a hardware scheduler circuit for scheduling fixed-function circuits, in accordance with at least some embodiments.

As described above, deep learning inference is based on operations that are well suited for hardware implementations. Deep Learning Accelerator (DLA) circuits, such as NVIDIA® Deep Learning Accelerator (NVDLA), can be used to address the computational demands of inference by providing building blocks that accelerate core deep learning operations. A deep learning accelerator can be used to accelerate different neural networks, such as convolutional neural networks (CNNs), recurrent neural networks (RNN), fully connected neural networks, and so on. These neural networks may have very different structures, may not follow any pre-defined network structure, and new neural networks are being introduced regularly.

Currently, DLA circuits use fixed-function engines (also referred to herein as fixed-function units or fixed-function circuits) for different types of layers in these neural networks, such as fixed-function engines for convolutions, activation functions, pooling, batch normalization, or the like. It should be noted that a neural network from an algorithmic perspective can be specified with one set of layers (referred to herein as "original layers") such as bias and batch normalization. Those original layers can be compiled or transformed into another set of layers (referred to herein as "hardware layers") where each hardware layer is used as a basic element for scheduling to be executed on an accelerator circuit. The mapping between original layers and hardware layers can be m:n, where m is the number of original layers and n is the number of hardware layers. For example, original layers bias, batch normalization and local response normalization (LRN), such as a rectified linear unit (ReLU), in a neural network can be compiled into one hardware layer. In that case, the m:n is 3:1. Each hardware layer can be represented by a basic hardware instruction for one of the fixed-function engines to perform an operation, and each layer communicates with another layer by a memory interface. For example, a first layer can be performed by a first-fixed function engine that receives an input tensor, performs an operation on the input tensor to generate an output tensor, and stores the output tensor in system memory, such as dynamic random access memory (DRAM) coupled to the accelerator. A second layer can be performed by a second fixed-function engine that receives the output tensor from the first layer from memory as a second input tensor, performs an operation on the second input tensor to generate a second output tensor, and stores the second output tensor in DRAM. Each communication introduces a tensor read operation and a tensor write operation in the memory interface.

These fixed-function engines can be scheduled by a host central processing unit (CPU) coupled to the DLA circuit. Alternatively, these fixed-function engines can be scheduled locally by firmware to ensure minimum latency. The firmware schedules these layers by handling dependencies across layers as outputs of one or more layers can be inputs for the next layers. A layer cannot start executing unless its inputs are ready. The firmware scheduler, which is responsible for scheduling these layers on engines, needs to be generic across all types of neural networks and should not require changes for different network types while keeping a theoretical scheduling latency to approximately zero to achieve maximum utilization of the DLA circuit. One firmware scheduler can update dependency counts for each of the layers it is dependent on. The firmware scheduler can track the dependency counts in system memory and read and write the dependency counts in system memory (e.g., DRAM) for each layer event. The read and write operations are costly operations for the DLA circuit, causing an increase in latency and possible security issues as data in the system memory cannot be kept as read-only. Since the number of layers for which dependency counts need to be updated is not fixed, and each update depends on system memory bandwidth available at that time, latency is variable and can be high for tracking and updating dependency counts for scheduling layers.

Aspects and embodiments of the present disclosure address these and other challenges by describing, for example, methods and systems that implement a hardware-based dependency algorithm. In at least one embodiment, the hardware-based dependency algorithm uses a simple property that only one layer can be executed on one engine at a time. The one engine executes the same type of layer only after a previous layer is completed. For example, a first fixed-function engine that executes operations of a convolution layer cannot execute operations of an activation layer. Similarly, a second fixed-function engine that executes operations of an activation layer cannot execute operations of the convolution layer. The hardware-based dependency algorithm can use an index of a current layer being executed on an engine as a dependency resolver based on this simple property. Instead of keeping track of all layers that it is dependent on, the hardware-based dependency algorithm can track one index for each layer type. The hardware-based dependency algorithm can be implemented in a hardware engine scheduler that is common to all network types since it is not dependent on the non-deterministic number of layers. In at least one embodiment, a single controller can control and maintain states of the fixed-function engines (also referred to herein as "engines"). Each engine can report to the controller its state (e.g., programmed, enabled, completed, or the like) and dependency information (in terms of layer index) that indicates layer indexes the currently programmed layer depends on before execution. The controller can enable the engine as soon as all the dependencies for the currently programmed layer are resolved. In this hardware implementation, each engine can report its state to the controller. The controller can check the current layer's state only and does not require memory transactions (e.g., read or write data from or to the system memory) to resolve layer dependencies.

FIG. 1 is a block diagram of an accelerator core 100 with a hardware scheduler circuit 102 for scheduling fixed-function circuits 104-114, in accordance with at least some embodiments. The accelerator core 100 (also referred to herein as DLA core or accelerator circuit) includes the hardware scheduler circuit 102 (also referred to herein as graph processor (GP)) and various fixed-function circuits, such as a convolution engine 104 (also referred to herein as convolution core), an activation engine 106 (also referred to herein as a single data processor (SDP) that is a single-point lookup engine for activation functions, a pooling engine 108 (also referred to herein as a planar data processor (PDP) that is a planar averaging engine for pooling, a local response normalization (LRN) engine 110 (also referred to herein as cross-channel data processor (CDP) that is a specialized unit that applies the LRN function that operates on channel dimensions, as opposed to the spatial dimensions, a data reshape engine 112 (also referred to herein as RUBIK that performs data format transformation (e.g., splitting or slicing, merging, contraction, reshape-transport), and a bridge direct memory access (DMA) engine 114 that can move data between the system DRAM and the dedicated memory interface. Additional details of the hardware scheduler circuit 102 are described below. In other embodiments, the accelerator core 100 can include more or fewer engines than set forth in FIG. 1. Each of these engines is separate and independently configurable. For example, a system that does not need pooling operations can remove the planar averaging engine entirely. For another example, a system that needs additional convolution performance can scale up the convolution core's performance without modifying other units in the accelerator core 100.

As illustrated in FIG. 1, the accelerator core 100 has multiple connections to the rest of a DLA system, including a configuration interface block 116 that includes a configuration space bus (CSB) interface and an interrupt interface. The configuration interface block 116 can be a control channel interface that implements a register file (e.g., configuration registers) and an interrupt interface (labeled as CSB/interrupt interface 118). In at least one embodiment, the CSB interface is a synchronous, low-bandwidth, low-power, 32-bit control bus designed to be used by a CPU (not illustrated in FIG. 1) to access configuration registers in the configuration interface block 116. The interrupt interface can be a 1-bit level-driven interrupt. The interrupt line can be asserted when a task has been completed or when an error occurs. The accelerator core 100 can also include a memory interface block 120 that uses one or more bus interfaces to interface with memory. In at least one embodiment, the memory interface block 120 has a primary memory interface 122 connecting to system memory (not illustrated in FIG. 1). The system memory can include DRAM. The primary memory interface 122 can be shared with the CPU and input/output (I/O) peripherals. In at least one embodiment, the primary memory interface 122 is a data backbone (DBB) interface that connects the accelerator core 100 and other memory subsystems. The DBB interface is a configurable data bus that can specify different address sizes, different data sizes, and issue different sizes of requests. In at least one embodiment, the DBB interface uses an interface protocol, such as AXI (Advanced Extensible Interface) or other similar protocols. In at least one embodiment, the memory interface block 120 has a second memory interface 124 that allows for a connection to higher-bandwidth memory dedicated to the accelerator core 100 or a computer vision subsystem. For example, the second memory interface 124 can be used with an on-chip SRAM to provide higher throughput and lower access latency.

The memory interface block 120 is coupled to each of the fixed-function engines 104-114. A convolution buffer 126 can be used between the memory interface block 120 and the convolution engine 104 to avoid repeated accesses to system memory. The convolution buffer 126 can be an internal RAM reserved for weight and input feature/pixel storage.

During inference, a typical flow begins with a management processor (either a microcontroller or a CPU), coupled to the accelerator core 100, sending a hardware layer configuration and an activate command. If data dependencies do not preclude this, multiple hardware layers can be sent to different engines and activated simultaneously (i.e., if there is another layer whose inputs do not depend on the previous layer's output). In at least one embodiment, every engine can have a double buffer for its configuration registers that allows a second layer's configuration to begin processing when the active layer has completed. Once a hardware engine finishes its active task, the configuration interface block 116 can interrupt the management processor to report the completion, and the management processor can begin the process again. This kind of command-execute-interrupt flow repeats until inference on the entire network is complete.

Referring back to FIG. 1, the hardware scheduler circuit 102 receives, from each of the fixed-function circuits (e.g., 104-114), state information associated with a respective layer being processed by a respective fixed-function circuit. The hardware scheduler circuit 102 receives dependency information that indicates a layer dependency condition for the respective layer being executed. As each of the engines executes layers, each engine can increment an executed layer identifier and compare the executed layer identifiers against the layer dependency condition to determine if each of the dependencies is resolved before enabling the execution of a current layer by the engine. In at least one embodiment, the dependency information can use a graph where each graph node specifies a layer dependency condition for a current layer to be executed. The layer dependency condition needs to be met before the respective engine executes the current layer. The layer dependency condition can include a set of indexes that specify what values the execution layer identifiers need to be before the current layer for a particular engine is executed. The graph and graph nodes can be created by a graph node component (e.g., a software module, compiler, or application) for each task to be performed. The graph node component can prepare the dependency information to indicate a kick-off condition (also referred to herein as the layer dependency condition) for each graph node. The hardware scheduler circuit 102 determines that a current layer at a first fixed-function circuit (e.g., 104-114) is programmed and determines that the layer dependency condition for the current layer at the first fixed-function circuit is satisfied using the state information and the dependency information. In response, hardware scheduler circuit 102 enables the first fixed-function circuit to process the current layer. In at least one embodiment, each of the fixed-function circuits processes a single layer of a neural network, and the fixed-function circuits process different layer types of the neural network. In at least one embodiment, the first fixed-function circuit is any one of the convolution engine 104, the activation engine 106, the pooling engine 108, the LRN engine 110, the data reshape engine 112, or the bridge DMA engine 114. Alternatively, the first fixed-function circuit can be other computational units of the accelerator core 100 or computational units external to the accelerator core 100.

In at least one embodiment, once the state information and dependency information are received from a second fixed-function (e.g., another one of 104-114), the hardware scheduler circuit 102 (also referred to herein as a graph processor) can determine that a current layer of the second fixed-function is programmed and that the layer dependency condition for the current layer at the second fixed-function circuit is satisfied using the state information and the dependency information reported to the hardware scheduler circuit 102. The hardware scheduler circuit 102 enables the second fixed-function circuit to process the current layer. In at least one embodiment, the current layer at the first fixed-function circuit and the current layer at the second fixed-function circuit are processed concurrently so long as their respective dependency is resolved. In other embodiments, the state information and the dependency information are determined by the hardware scheduler circuit 102 without receiving this information from the fixed-function engines. For example, the hardware scheduler circuit 102 can determine the information from configuration registers, graph nodes, or the like, as described herein.

In at least one embodiment, the hardware scheduler circuit 102 includes an engine scheduler circuit (or "engine scheduler" or "ES") for each of the fixed-function engines 104-114. For example, as described in more detail with respect to FIGS. 2-3, if there are three engine schedulers (ES) used for three fixed-function engines, the index of the three ESes needs to be resolved with the execution layer identifiers of each of the three types of engines before the assigned engine can execute a current layer. For each ES, the hardware-based scheduling algorithm selects an entry from a queue and checks if the kick-off condition is satisfied for the entry. If the kick-off condition is satisfied, the layer's execution is enabled, and the entry is removed from the queue. If the kick-off condition is not satisfied, the entry remains in the queue. After the engine completes a layer's execution, the ES updates the execution layer identifier, and the process continues. When all layers are done, the ESes will be set to idle.

In at least one embodiment, each of the engine scheduler circuits includes a queue, a DMA engine, and a controller. The DMA engine can retrieve information about one or more layers to be processed by the respective fixed-function circuit and store the information in one or more entries of the queue. Each entry corresponds to a layer to be processed by the individual fixed-function circuit. The controller can select an entry from the queue associated with the current layer at the respective fixed-function circuit. The controller can determine that the current layer at the first fixed-function circuit is programmed and the layer dependency condition is satisfied. The controller can enable the respective fixed-function circuit responsive to the current layer being programmed and the layer dependency condition to be satisfied. In at least one embodiment, the controller can be implemented as a hardware state machine, such as described in more detail below with respect to FIG. 4. Alternatively, the controller can be implemented using other circuits.

In at least one embodiment, the hardware scheduler circuit 102 includes an engine scheduler circuit for one or more external components, such as a microcontroller coupled to the accelerator core 100, a CPU coupled to the accelerator core 100, or both. In this manner, the layer dependency condition can specify that external components' operations need to be completed before executing a layer assigned to a particular engine. In at least one embodiment, the hardware scheduler circuit 102 includes a graph processor (GP) controller coupled to each of the engine scheduler circuits and an identifier (ID) array. The ID array can store executed layer identifiers for each of the engine scheduler circuits (ESes 302, 312, 322, 332, 342, 352, 362). Each of the engine scheduler circuits can store dependency information and state. In at least one embodiment, dependency information is stored in the respective queue while the state can be stored in the hardware context. In at least one embodiment, the executed layer identifier (executed_layer_id) is a number of nodes (layers) that have been executed for the corresponding engine scheduler circuit (ES). The executed layer identifier can be initialized to a default number, such as −1, for match a dependency layer identifier (dep_layer_id). The executed layer identifier can increment by one once a node is executed. If one ES is associated with a fixed-function circuit, the node is considered "executed" when the fixed-function circuit finishes certain hardware operations and the results have been written back to memory. In this case, a signal is sent from the fixed-function circuit to the GP controller 320. If one ES is associated with an external component, like the CPU, the node is "executed" when the external component finishes its task or job. An explicit CSB write to the ID array 310 can be done to increment the executed layer identifier in the ID array 310. In at least one embodiment, a general scheduling algorithm is implemented across multiple engine schedulers (ESes). The number of ESes should be at least the same number of fixed-function engines (corresponding to the layers being scheduled). There can be more ESes for additional external components, such as the CPU or microcontroller performing some task or job. Each ES operates independently (including node fetching, engine programming, dependency resolving, etc.). For example for fetching, all ESes raise requests to its DMA to fetch a corresponding graph node that includes the dependency information. The ID array can store executed layer identifiers. The ESes can use the dependency information and the executed layer identifiers to independently resolve the dependency conditions for a respective layer being scheduled for the respective fixed-function engine. For example, if there are three engine schedulers (ES), all executed layer identifiers are initialized to −1, meaning there is no dependency required. For each ES, the scheduling algorithm selects a first entry from its respective queue and checks if the kick-off condition is satisfied. If the kick-off condition is satisfied, the ES kicks off the layer and then removes the entry from the queue; otherwise, it is kept in the queue. For example, for a first ES scheduling a first layer (e.g., A1), the dependency information specifies the executed layer identifiers needed to be completed before the first layer is enabled for the first fixed-function engine. After the first layer is scheduled, the first ES can fetch a next node for analyzing. After the node is executed by the corresponding fixed-function circuit, a signal is triggered to the appropriate ES and the ES increments its executed layer identifier. This event can be broadcast to the other ESs, and the scheduling algorithm can transitions to the next layer of the same fixed-function engine, as well as other layers that were dependent on the completion of the first layer. When all layers are marked as completed, the ESes can be set to idle. In at least one embodiment, the hardware scheduler circuit 102 includes an issue arbiter and a DMA arbiter to communicate on an internal bus and a memory bus, respectively.

Figure 2:
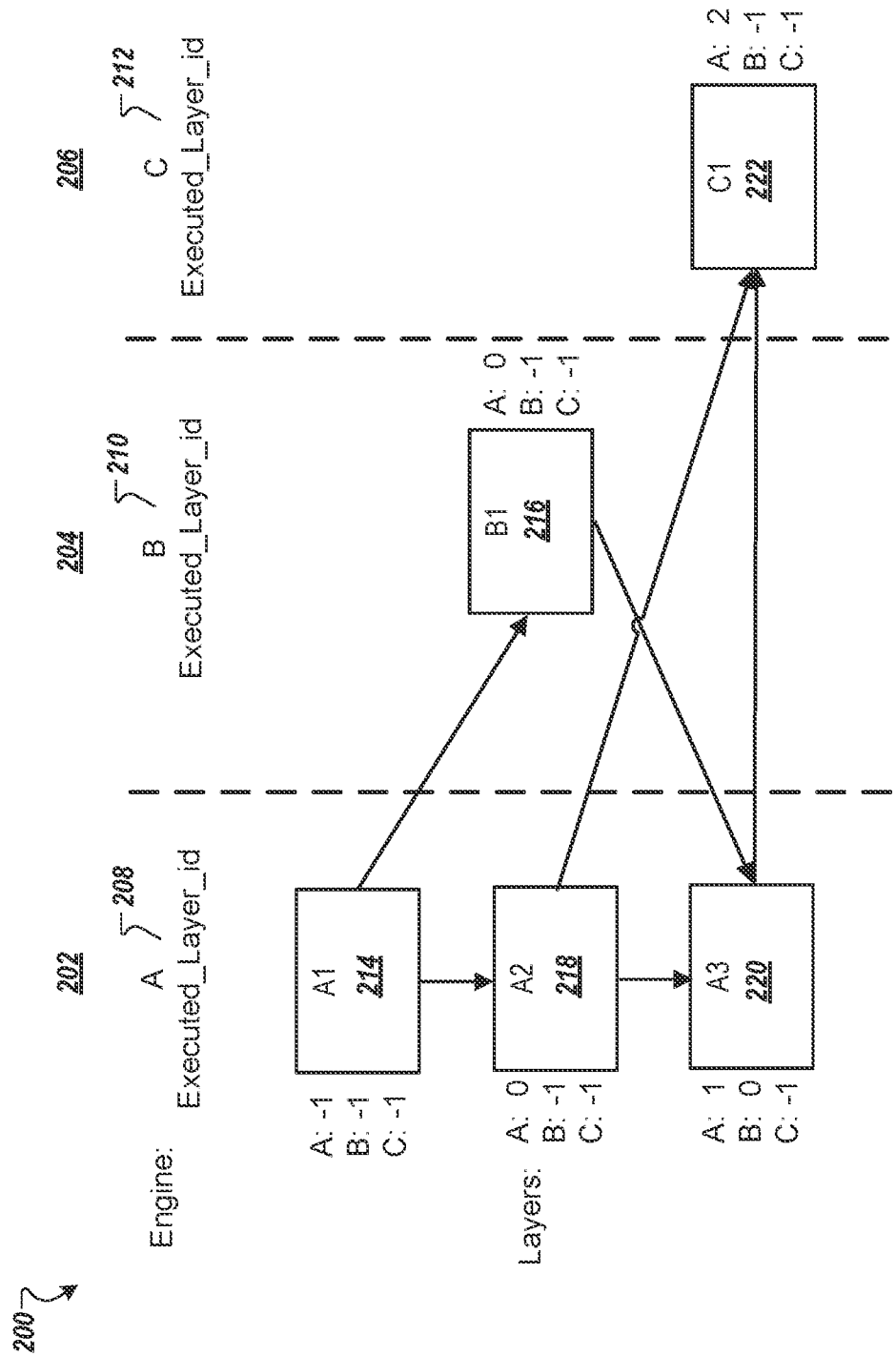
FIG. 2 is a flow diagram of a scheduling algorithm for resolving dependencies for scheduling execution of multiple layers on three fixed-function engines, in accordance with at least some embodiments.

FIG. 2 is a flow diagram of a scheduling algorithm 200 for resolving dependencies for scheduling execution of multiple layers on three fixed-function engines, in accordance with at least some embodiments. In these embodiments, there are three engine schedulers 202-206, corresponding to three fixed-function engines (e.g., 104-114). A first engine scheduler 202 schedules a first engine (Engine A) to execute a first type of layer of a neural network and uses a first executed layer identifier 208 to track a highest completed layer by the first engine scheduler 202. A second engine scheduler 204 schedules a second engine (Engine B) to execute a second type of layer of the neural network and uses a second executed layer identifier 210 to track a highest completed layer by the second engine scheduler 204. A third engine schedule 206 schedules a third engine (Engine C) to execute a third type of layer of the neural network and uses a third executed layer identifier 212 to track a highest completed layer by the third engine scheduler 206. Each of the executed layer identifiers is initialized to a default number, such as −1. The first engine scheduler 202 can determine that a first layer 214 (A1) is programmed and a first layer dependency condition is satisfied (A: −1, B: −1, C: −1). Since each of the executed layer identifiers are initialized to −1, the first layer dependency condition is satisfied. In response, the first engine scheduler 202 can enable the first fixed-function engine to execute the first layer 214.

It should be noted that the second engine scheduler 204 can determine that a second layer 216 (B1) is programmed. Still, until the first layer 214 (A1) is completed, the second engine scheduler 204 determines that a second layer dependency condition (A: 0, B: −1, C: −1) is not met since the first executed layer identifier 208 (A) is still −1. Once the first layer 214 (A1) is completed by the first fixed-function engine, the first scheduler 202 increments the first executed layer identifier 208 (A) to 0 from −1. As a result of the first executed layer identifier (A) being updated, the first scheduler 202 can determine that a third layer dependency condition is satisfied (A: 0, B: −1, C: −1). Similarly, the second scheduler 210 can determine that the second layer dependency condition is satisfied. Since the second scheduler 210 already determined that the second layer 216 (B1) is programmed, the second scheduler 210 can enable the second fixed-function engine to execute the second layer 216. The first scheduler 202 can also determine that a third layer 218 (A2) is programmed. Since the third layer dependency condition is satisfied (A: 0, B: −1, C: −1), the first scheduler 202 can enable the first fixed-function engine to execute the third layer 218 (A2). Once the first layer 214 (A1) is completed by the first fixed-function engine, the first scheduler 202 increments the first executed layer identifier 208 (A) to 1 from 0. Once the second layer 216 (B1) is completed by the second fixed-function engine, the second scheduler 204 increments the second executed layer identifier 210 (B) to 0 from −1. As a result of the first executed layer identifier 208 (A) and the second executed layer identifier 210 (B) being updated, the first scheduler 202 can determine that a fourth layer dependency condition is satisfied (A: 1, B: 0, C: −1). Assuming the first scheduler 202 also determines that a fourth layer 220 (A3) is programmed, the first scheduler 202 can enable the first fixed-function engine to execute the fourth layer 220 (A3).

Once the fourth layer 220 (A3) is completed by the first fixed-function engine, the first scheduler 202 increments the first executed layer identifier 208 (A) to 2 from 1. As a result of the first executed layer identifier 208 (A) being updated, the third scheduler 206 can determine that a fifth layer dependency condition is satisfied (A: 2, B: −1, C: −1). Assuming the third scheduler 206 also determines that a fifth layer 222 (C1) is programmed, the third scheduler 206 can enable the third fixed-function engine to execute the fifth layer 222 (C1). It should be noted that the fifth layer dependency condition specifies a dependency on the third layer 218 (A2) and the fourth layer 220 (A3) being executed by the first fixed-function engine 202. The fifth layer dependency condition does not indicate any dependency on the layers executed by the second fixed-function engine 204.

As illustrated in FIG. 2, the scheduling algorithm 200 can use a graph-based representation of the dependency information of multiple layers of a neural network, regardless of the number of layers and the number of dependencies. The scheduling algorithm 200 can track an executed layer identifier for each type of fixed-function engine (corresponding to each type of layer of the neural network) and a layer dependency condition for each graph node in the graph.

Figure 3:
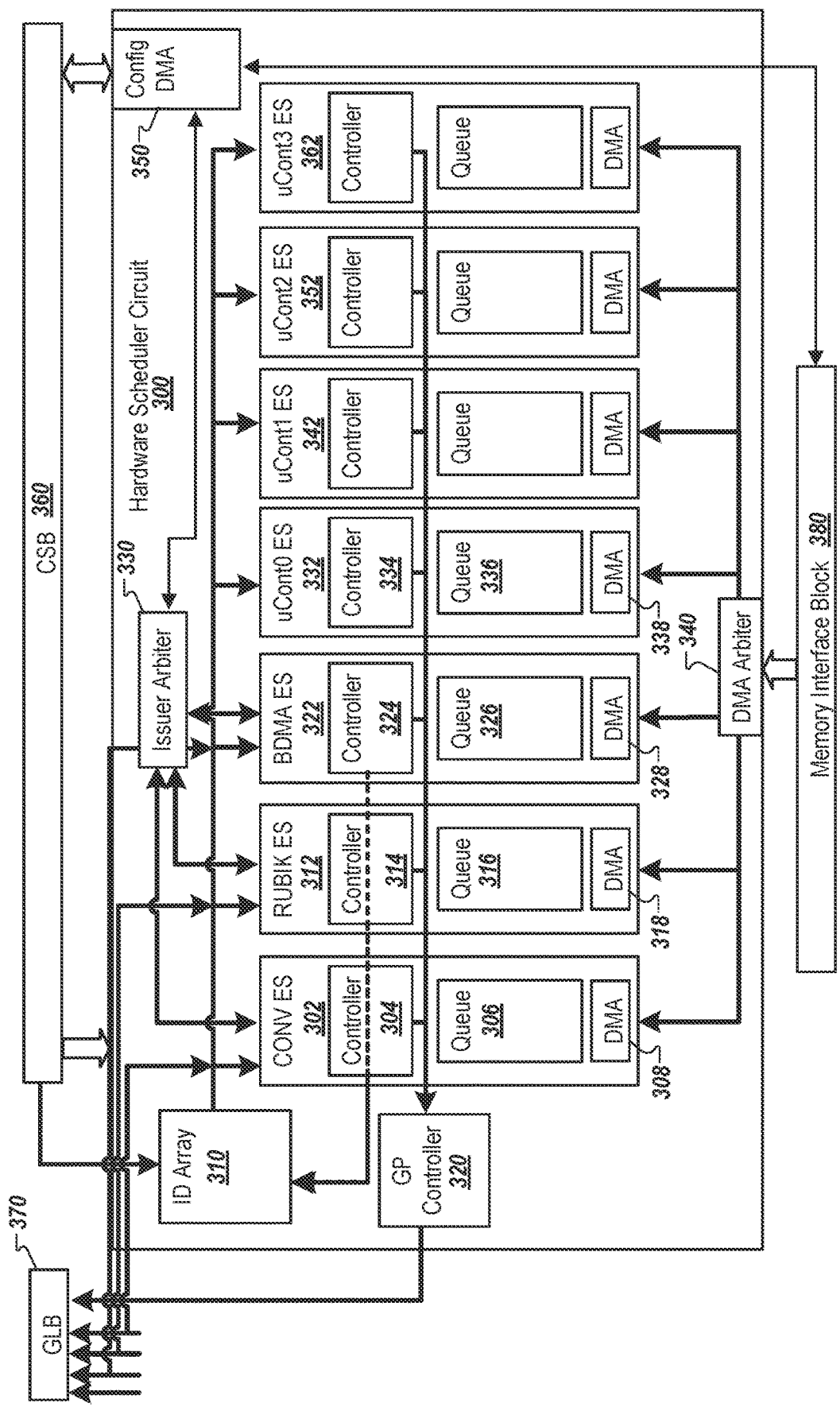
FIG. 3 is a block diagram of a hardware scheduler circuit with multiple engine scheduler circuits, in accordance with at least some embodiments.
Figure 5:
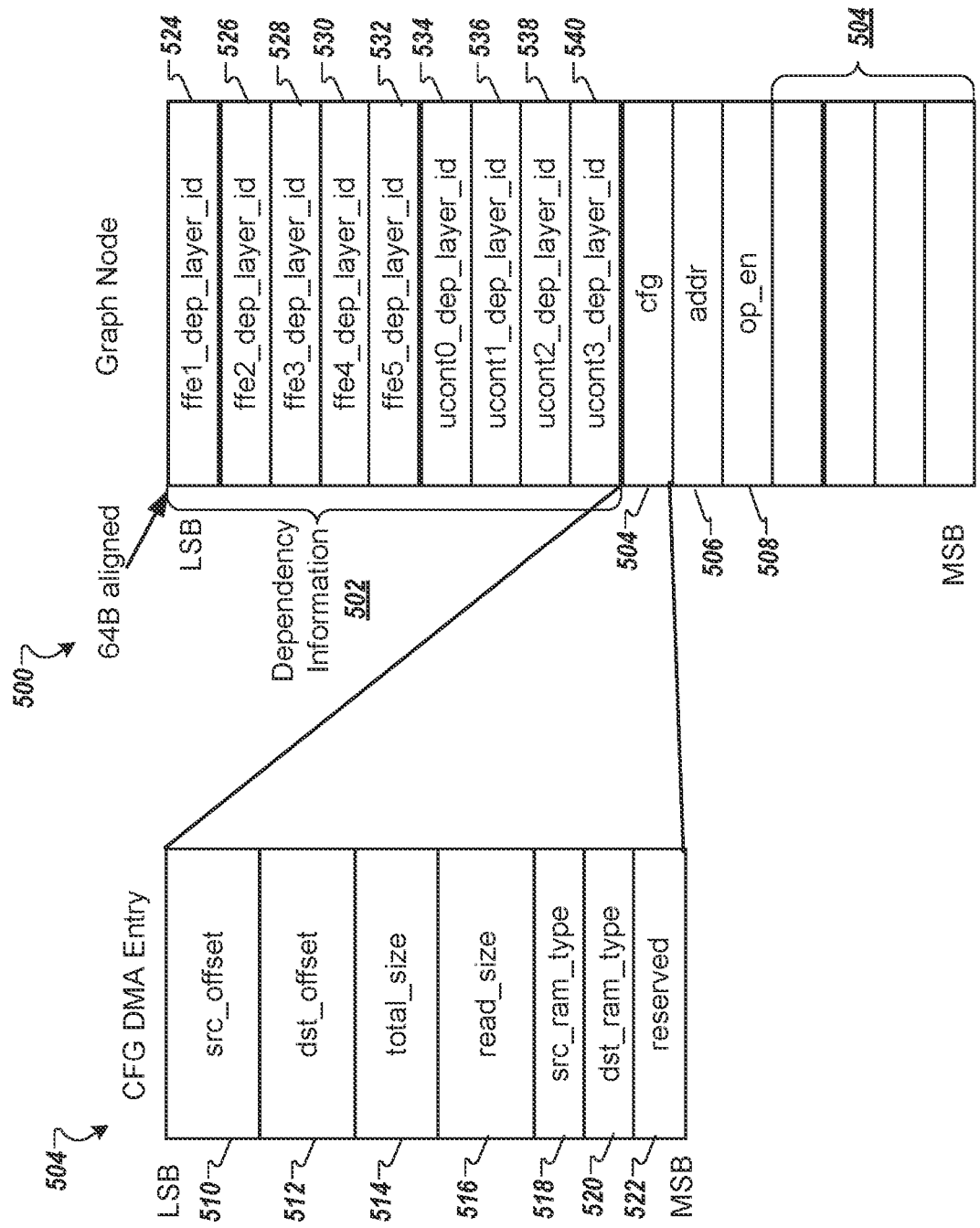
FIG. 5 is an example graph node associated with a first layer to be executed by a first fixed-function engine, in accordance with at least some embodiments.

FIG. 3 is a block diagram of a hardware scheduler circuit 300 with multiple engine scheduler circuits, in accordance with at least some embodiments. The hardware scheduler circuit 300 includes a first engine scheduler circuit 302 that includes a first controller 304, a first queue 306, and a first DMA engine 308. The first queue 306 can store one or more entries corresponding to a layer to be processed by the first fixed-function engine. The first DMA engine 308 can fetch, from memory via the memory interface block 380, a first layer to be executed by a first fixed-function engine. The first DMA engine 308 retrieves data from a CPU or a microcontroller via the CSB/interrupt interface 118 and stores the data as a first data structure in an entry of the first queue 306. In at least one embodiment, a CPU or microcontroller can write the dependency graph to a certain address in system memory with the specified data structure, such as described and illustrated with respect to FIG. 5. The CPU or microcontroller sets those address to the hardware scheduler circuit 300 through the CSB interface. The respective DMA engine from the respective ES fetches graph nodes from the programmed address and stores them in the respective queue (e.g., 306). The respective controller (e.g., 304) analyzes the dependency information of that node and controls the respective engine accordingly. The first controller 304 can analyze the entry to determine dependency information for the first layer. The first data structure can be considered a first graph node, such as illustrated in FIG. 5. The first controller 304 uses the first graph node to determine the dependency information and resolve the first layer's dependency information before enabling the first fixed-function engine to execute the first layer. The first controller 304 can also determine from state information that the first layer is programmed in the configuration register. In one embodiment, the state information is received from the first fixed-function engine. In another embodiment, the state information is returned to the first controller 304 implicitly from a configuration DMA 350 of the hardware scheduler circuit 300.

In at least one embodiment, the configuration DMA 350 can retrieve configuration information for the hardware scheduler circuit 300 by reading statistic registers, such as performance counters. In at least one embodiment, the configuration DMA 350 can retrieve configuration information by receiving configuration commands (referred to as cfgdma commands) from the engine scheduler circuits 302, 312, 322, 332, 342, 352, or 362, via a bus between an issuer arbiter 330 and the configuration DMA 350. In at least one embodiment, the configuration DMA 350 receives cfgdma commands) from the engine scheduler circuits 302, 312, 322, 332, 342, 352, or 362 using a command data structure, such as illustrated in a graph node 500 in FIG. 5. The configuration DMA 350 guarantees in-order execution of cfgdma commands. In each graph node, there are three fields in a configuration command data structure, including a configuration field (e.g., 504), an address field (e.g., 506), and an operation enable field (e.g., 508). The commands can be issued through these three fields of the command data structure. For example, a respective ES can issue a command to the configuration DMA 350 using the graph node, including a configuration command in the configuration field (e.g., 504), an address command in the address field (e.g., 506), and operation enable command (op_en) in the operation enable field (e.g., 508).

An offline tool, such as a compiler generates a graph node (GP node) (e.g., 500 in FIG. 5) and some instructions. The compiler can populate all fields of the graph node and multiple graph nodes can be organized as different lists. For example, for a network that requires three convolution layers and two data reshape layers, the compiler generates two lists, including: i) a first list for the first engine scheduler circuit 302 (conv_es) containing three graph nodes and ii) a second list for the second engine scheduler circuit 312 (rubik_es) containing two graph nodes. The compiler also generates instructions that are consumed by the configuration DMA 350. Theses instructions can be a list of register-value pairs used to program the corresponding fixed-function engine. Using the example above of the three convolution layers and two data reshape layers, there will be 9 lists of register-value pairs (3 layers*3 commands (cfg/addr/op_en)) for the three convolution layers and 6 lists of register-value pairs (2 layers*3 commands (cfg/addr/op_en)) for the data reshape layers. It should be noted that these instructions are different than the instructions illustrated in FIG. 5 (e.g., 504, 506, 508), which are configuration commands that tell the configuration DMA 350 the number of instructions to program (e.g., 514) and where to fetch (e.g., 510, 518) and store (e.g., 512, 522) the instructions.

After creation, the compiler stores the graph node (e.g., 500) in memory to be retrieved by the DMA of the engine scheduler circuit (e.g., DMA 308 of ES 302, DMA 316 of ES 312, etc). Once retrieved, the graph node is stored in the internal FIFO of the engine scheduler circuit (e.g., 306). Then when the entry is at the top of the queue, the respective controller (e.g., 304) can execute the configuration command (cfgdma command 504) to the configuration DMA 310. The configuration DMA 310 can fetch the instructions which are pointed to by the fields 510, 518, then programs the registers through a configuration interface block 360 (CSB) for the fixed-function engine being scheduled. At this time, the fixed-function engine has been programmed, but not enabled by the engine scheduler circuit. The engine scheduler circuit (e.g., 302) waits until the dependency is resolved and then it issues the operation enable command (op_en) to the configuration DMA 310 (e.g., via the operation enable field 508). The configuration DMA 310 fetches the instructions and programs the fixed-function engine via the CSB 360 to be enabled to start execution of the programmed layer.

In at least one embodiment, for each graph node, at least two requests (referred to as configuration DMA requests or cfgdma requests) can be raised from the engine scheduler circuit (ES) (e.g., 302) to the configuration DMA 350, including a request for configuration register programming (cfg register programming) and a request for operation enable programming (OP_en programming). The engine scheduler circuit (ES) (e.g., first controller 304) can fetch a graph node from memory using the DMA engine (e.g., 308). Since configuration DMA 350 guarantees the in-order execution, the engine scheduler circuit (ES) assumes the corresponding engine is "programmed" once the configuration DMA 350 receives the cfg register programming request. It should be noted that the configuration DMA 350 may not actually be finished programming the registers, but the engine scheduler circuit (ES) knows that those configuration registers will be programmed eventually. Subsequently once the engine scheduler circuit (ES) has resolved the dependency information, the engine scheduler circuit (ES) can trigger another request for operation enable programming (OP_en programming) in the an operation enable field (e.g., 508) even if the configuration DMA 350 is still busy as the configuration DMA 350 in-order execution behavior guarantees operation enable programming (OP_en programming) is not programmed before the configuration register programming is complete. Issuing requests using the command data structure can be done to minimize the communication between the fixed-function engines and the hardare scheduler circuit 300.

Once the first layer is programmed, the first controller 304 can compare the dependency information in the first graph node against executed layer identifiers stored in an identifier array (ID array) 310. The ID array 310 can store a register value for each of the engine scheduler circuits in the hardware scheduler circuit 300. The register values can be initialed to a default value, such as −1, as described above with respect to FIG. 2. The first controller 304 can determine that the dependency information in the first graph node indicates a layer dependency condition (A: −1, B: −1, C: −1) and that the layer dependency condition is met. The register values (−1, −1, −1) for the engine scheduler circuits are equal to or less than a corresponding value in the layer dependency condition. The first controller 304 enables the first fixed-function engine to execute the first layer once the first layer is programmed and the layer dependency condition for the first layer is satisfied. Once the first layer is executed, the first fixed-function engine reports the change in state to being completed, and the executed layer identifier can be updated in the ID array 310. The completed event can be broadcast to the other engine scheduler circuits to determine whether the respective engine scheduler circuit can enable the next entry in its corresponding queue. Alternatively, the other engine scheduler circuits can detect the change in the executed layer identifiers to determine whether the respective engine scheduler circuit can enable the next entry in its corresponding queue.

In at least one embodiment, the hardware scheduler circuit 300 includes a second engine scheduler circuit 312 having a second controller 314, a second queue 316, and a second DMA engine 318. The second DMA engine 318 can fetch, from memory via the memory interface block 380, a second layer to be executed by a second fixed-function engine. The second queue 316 can store one or more entries corresponding to a layer to be processed by the second fixed-function engine. The second DMA engine 318 retrieves data from a CPU or a microcontroller via the CSB/interrupt interface 118 and stores the data as a second data structure in an entry of the second queue 306. The second controller 314 can analyze the entry to determine dependency information for the second layer. Similarly, as described above for the first engine scheduler circuit 302, the second engine scheduler circuit 312 determines that the second layer is programmed and a layer dependency condition is satisfied (e.g., A: 0, B: −1, C: −1) before enabling the second fixed-function circuit to execute the second layer.

In at least one embodiment, the hardware scheduler circuit 300 includes a third engine scheduler circuit 322 having a third controller 324, a third queue 326, and a third DMA engine 328 that operate similarly as the first engine scheduler circuit 302 and the second engine scheduler circuit 312. In at least one embodiment, the hardware scheduler circuit 300 includes additional engine scheduler circuits for other fixed-function engines of the accelerator core and additional engine scheduler circuits for external components, such as an external microcontroller, an external CPU, or the like. For example, in at least one embodiment, the hardware scheduler circuit 300 includes a fourth engine scheduler circuit 332 having a fourth controller 334, a fourth queue 336, and a fourth DMA engine 338 that operate similarly as the first engine scheduler circuit 302, except because it is communicating with an external component, it uses a GP controller 320 to communicate with the external component. For example, the fourth controller 334 can receive state information from the external component via the GP controller 320 and can enable the execution of an operation on the external component once a layer dependency condition for the operation is satisfied. In at least one embodiment, the hardware scheduler circuit 300 can include a fifth engine scheduler circuit 342, a sixth engine scheduler circuit 352, and a seventh engine scheduler circuit 362 that can be used for additional components. For example, the fourth engine scheduler circuit 332 can be associated with operations to be performed by a CPU coupled to the accelerator core, and a fifth engine scheduler circuit 342 can be associated with operations to be performed by a microcontroller that is coupled to the accelerator core.

In at least one embodiment, the DMA engines can be coupled to a DMA arbiter 340 to manage access to the memory interface block 380. In at least one embodiment, an issuer arbiter 330 can arbitrate access to an internal bus 370 (GLB) coupled to each of the fixed-function engines of the accelerator core. The issuer arbiter 330 can sequentialize the requests from the multiple ESes as the multiple ESes can initiate requests at the same cycle. Given that there is one instance of the configuration DMA 350, the issuer arbiter 330 can decided which ES request can be granted.

Figure 4:
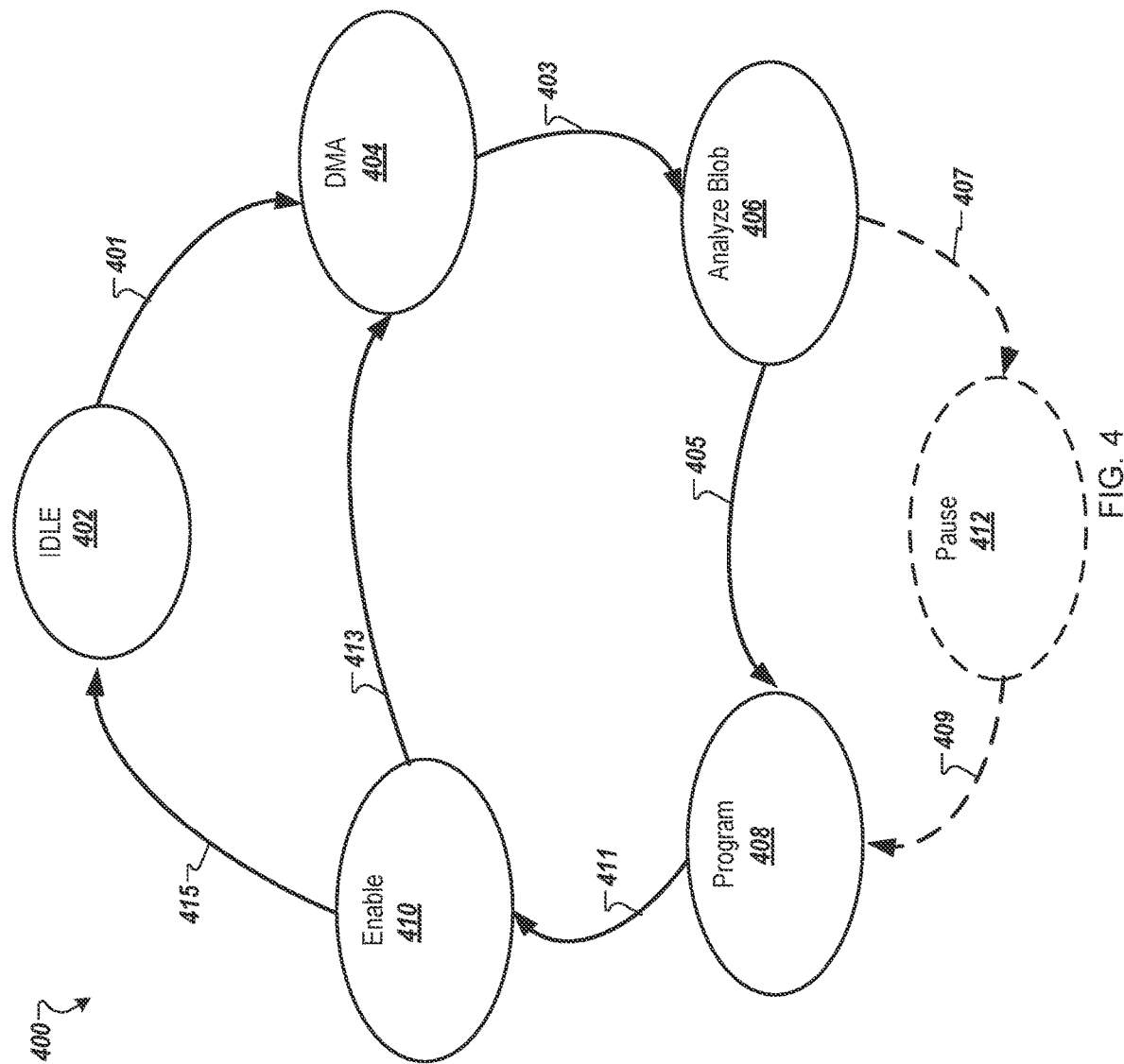
FIG. 4 is a diagram of a hardware state machine of a hardware scheduler circuit, in accordance with at least some embodiments.

FIG. 4 is a diagram of a hardware state machine 400 of a hardware scheduler circuit, in accordance with at least some embodiments. The hardware state machine 400 starts in an idle state 402. In response to a first condition 401 being satisfied, the hardware state machine 400 transitions to a DMA state 404 to fetch a current layer to be executed. In at least one embodiment, the first condition 401 is satisfied responsive to a determination that a number of layers remaining to execute is greater than zero, and there is at least one empty slot (also referred to herein as an entry) in a queue. Alternatively, other conditions can be defined to determine whether to transition from the idle state 402 to the DMA state 404. In response to a second condition 403 being satisfied, the hardware state machine 400 transitions to an analyze state 406 in which the hardware state machine 400 analyzes data retrieved for programming and executing the current layer. In at least one embodiment, the second condition 403 is satisfied responsive to determining that a total number of slots less a count of empty slots is greater than zero, and a number of empty register groups is greater than zero. Alternatively, other conditions can be defined to determine whether to transition from the DMA state 404 to the analyze state 406. In the analyze state 406, the hardware state machine 400 can determine whether a third condition 405 or a fourth condition is met 407. In response to the third condition 405 being met, the hardware state machine 400 transitions to a program state 408 in which the current layer is programmed in the register group. In at least one embodiment, the third condition 405 is met responsive to determining that a pause command has not been issued (e.g., Node.pause==0). In response to the fourth condition 407 being met, the hardware state machine 400 transitions to a pause state 412 in which the event scheduler circuit is paused. In at least one embodiment, the fourth condition 407 can have a higher priority than the third condition 405. In at least one embodiment, the fourth condition 407 is met responsive to a determination that a pause command has been issued (e.g., Node.pause==1). In the pause state 412, the hardware state machine 400 can determine if a fifth condition 409 is met to transition to the program state 408. In at least one embodiment, the fifth condition 409 is met responsive to determining that the engine scheduler circuit is to continue (e.g., ES.continue==1). It should be noted that the pause state 412 can be used as a debugging feature. For example, the condition can be met responsive to a debugger sending a continue command to the hardware scheduler circuit to exit from a pause state. In the program state 408, the hardware state machine 400 determines whether the current layer is programmed in the register group, and a sixth condition 411 is met in order to transition to an enable state 410. In at least one embodiment, the sixth condition 411 is met responsive to a determination that a layer dependency condition for the current layer is satisfied (e.g., ExecutedLayerId>=dep_layer_id). In the enable state 410, the hardware state machine 400 issues an enable signal to a fixed-function engine corresponding to the hardware scheduler circuit. In the enable state 410, the hardware state machine 400 determines whether a seventh condition 413 or an eighth condition 415 is met. In at least one embodiment, the seventh condition 413 is met if there are still a number of layers to be executed (e.g., left_layer_num>0). In at least one embodiment, the eighth condition 415 is met if all layers have been executed (e.g., all jobs are done?). If the seventh condition 413 is met, the hardware state machine 400 transitions to the DMA state 404 to fetch a subsequent layer. If the eighth condition 415 is met, the hardware state machine 400 transitions to the idle state 402.

In at least one embodiment, the hardware scheduler circuit 400 includes multiple ES (engine schedulers). The number of ESes should be at least the same number of fixed-function engines. There can be more ESes for additional external components, as described herein. Each ES operates independently (including node fetching, engine programming, dependency resolving, etc.). For example for fetching, all ESes raise requests to its DMA to fetch a graph_node from memory at the same time and the DMA arbiter 340 can decide the grant order of the requests. Once a fixed-function engine completes, a signal will be sent to the associated ES to increment the executed layer identifier in the ID array 310. Once there is an update in the ID array 310, this update event can be broadcast to all ESes to invoke dependency resolving.

It should also be noted that the embodiments described herein are directed to scheduling layers in deep learning neural networks. The aspects and embodiments described herein can also be used in any directed acyclic graph (DAG) compute graph handling environments.

FIG. 5 is an example graph node 500 associated with a first layer to be executed by a first fixed-function engine, in accordance with at least some embodiments. The graph node 500 is a data structure that includes dependency information 502, including a dependency layer identifier for each of the engine schedulers used for the fixed-function engines in the accelerator core, configuration information 504, address information 506, and an operation enable field 508. The dependency information 502, for example, includes a first dependency layer identifier for a first fixed-function (labeled ffe1_dep_layer_id) in a first field 524, a second dependency layer identifier for a second fixed-function (labeled ffe2_dep_layer_id) in a second field 526, a third dependency layer identifier for a third fixed-function (labeled ffe3_dep_layer_id) in a third field 528, a fourth dependency layer identifier for a fourth fixed-function (labeled ffe4_dep_layer_id) in a fourth field 530, and a fifth dependency layer identifier for a fifth fixed-function (labeled ffe5_dep_layer_id) in a fifth field 532. The dependency information 502 can also include dependency layer identifiers for multiple external components, such as a CPU or a microcontroller, in fields 534-540. The data structure can include other fields 542 for acknowledgement signaling and pause signaling for debugging purposes.

The configuration information 504 can be a configuration DMA entry that includes information about a source offset 510, a destination offset 512, a total size 514, a read size 516, a source type 518, and a destination type 520. The first layer's operation will not be executed until the operation enable field 508 is set to be enabled by a first engine scheduler associated with the first fixed-function engine when the dependency information 502 is resolved as described herein. The first engine scheduler can check an executed layer identifier for each of the other fixed-function engines and compare the executed layer identifiers against the dependency information 502. As described herein, the first engine scheduler can determine that the first layer is programmed in the configuration registers and that the dependency information 502 is resolved. When the first layer is programmed and the dependency information 502 is satisfied, the first engine scheduler can send a request to the configuration DMA 350 to set the operation enable field 508 to enable the first fixed-function engine to execute the first layer. Once the first fixed-function engine is completed, the state of the first fixed-function engine is completed and the executed layer identifier is incremented. Incrementing the executed layer identifier can cause the engine schedulers to check for dependency information being satisfied to enable the next layer to be executed, assuming the next layer is also programmed.

FIG. 5 also shows an example configuration DMA entry for the configuration information 504. The configuration DMA entry stores configuration information 504 for the current layer. For example, the configuration information 504 includes source and destination address offsets 510, 512, a total size of data 514, a read size of data 516, and source and destination types 518, 520. The configuration information 504 can also include one or more reserved fields 522. The configuration DMA entry contains the necessary information to launch one configuration DMA (cfgdma) execution of a current layer. The configuration DMA entry can contain information where the instruction is stored in memory and whether the address is an absolute address or a relative offset to a base address. The configuration DMA entry can contain information where the register values are stored in memory and whether the address is an absolute address or a relative offset to a base address. The configuration DMA entry can contain information that indicates the number of instructions to be issued by the cfgdma (e.g., num_total_inst). The configuration DMA entry can contain information that indicates a number of instructions used for reading inside the total number of instructions (e.g., number of ts_cfgdma_inst used for read operations inside the total number of instructions).

As described above, for each graph node, at least two cfgdma requests can be raised from the engine scheduler circuit (ES) to the configuration DMA 350, including configuration register programming (cfg register programming) and operation enable programming (OP_en programming) in which the configuration DMA 350 sets the operation enable field 508. Since configuration DMA 350 guarantees the in-order execution, the engine scheduler circuit (ES) knows the corresponding engine is "programmed" once configuration DMA 350 receives the cfg register programming request. It should be noted that the configuration DMA 350 may not actually be finished programming the registers, but the engine scheduler circuit (ES) knows that those configuration registers will be programmed eventually. The engine scheduler circuit (ES) can trigger another cfgdma request for the configuration DMA 350 to set the operation enable field 508 (OP_EN) even if the cfgdma is still busy as the configuration DMA 350's in-order execution behavior guarantees the operation enable field 508 (OP_EN) is not programmed before the configuration register programming is complete. This can be done to minimize the communication between the engines and the hardare scheduler circuit 300.

Figure 6:
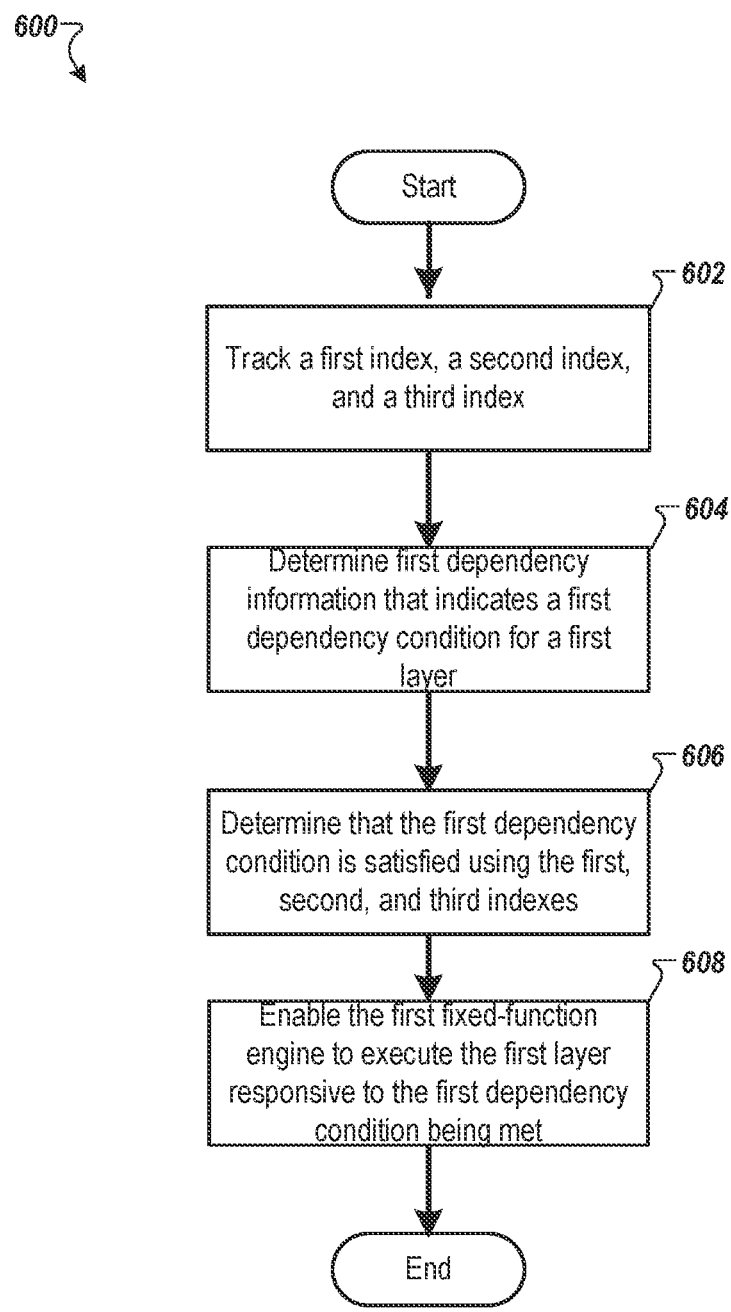
FIG. 6 is a flow diagram of a method of scheduling layers of a neural network according to dependency conditions, in accordance with at least some embodiments.

FIG. 6 is a flow diagram of a method 600 of scheduling layers of a neural network according to dependency conditions, in accordance with at least some embodiments. Method 600 can be performed by processing logic comprising hardware, software, firmware, or any combination thereof. In at least one embodiment, the method 600 is performed by the hardware of accelerator core 100 of FIG. 1. In at least one embodiment, the method 600 is performed by hardware scheduler circuit 102 of FIG. 1. In at least one embodiment, the method 600 is performed by hardware scheduler circuit 300 of FIG. 3. In at least one embodiment, the method 600 is performed by any of the engine scheduler circuits 302, 312, 322, 332, 342, 352, or 362 of FIG. 3. In at least one embodiment, the method 600 is performed by hardware state machine 400 of FIG. 4.

Referring back to FIG. 6, the method 600 begins by processing logic tracking a first index (e.g., first execution layer index) indicative of a latest layer executed by a first fixed-function engine, a second index (e.g., second execution layer index) indicative of a latest layer executed by a second fixed-function engine, and a third index (e.g., third execution layer index) indicative of a latest layer executed by a third fixed-function engine (block 602). From the first fixed-function engine, the processing logic receives first dependency information that indicates a first dependency condition (e.g., first layer dependency condition) for a first layer to be executed by the first fixed-function engine (block 604). The processing logic determines that the first dependency condition is satisfied (block 606). The processing logic enables the first fixed-function engine to execute the first layer responsive to the first dependency condition being satisfied (block 608), and the method 600 ends.

In a further embodiment, the processing logic receives, from the first fixed-function engine, a first state of the first layer to be processed by the first fixed-function engine. In another embodiment, the processing logic determines a first state of the first layer implicitly without receiving it from the first fixed-function engine. The processing logic determines that the first state indicates that the first layer is programmed at the first fixed-function engine. The first fixed-function engine is enabled responsive to the first dependency condition being satisfied and responsive to the first state, indicating that the first layer is programmed.

In a further embodiment, the processing logic receives a first state of the first layer from the first fixed-function engine. The processing logic determines that the first state indicates that the first layer is completed at the first fixed-function engine. The processing logic updates the first index to an updated first index. The processing logic receives second dependency information from the second fixed-function engine, which indicates a second dependency condition for a second layer to be executed by the second fixed-function engine. The processing logic determines that the second dependency condition is satisfied using the updated first index, the second index, and the third index. The processing logic enables the second fixed-function engine to execute the second layer responsive to the second dependency condition being satisfied.

In a further embodiment, the processing logic receives third dependency information from the third fixed-function engine, which indicates a third dependency condition for a third layer to be executed by the first fixed-function engine. The processing logic determines that the third dependency condition is satisfied using the updated first index, the second index, and the third index. The processing logic enables the first fixed-function engine to execute the third layer responsive to the third dependency condition being satisfied, wherein the second layer and the third layer are executed concurrently.

In a further embodiment, the processing logic receives a first state of the first layer from the first fixed-function engine. The processing logic determines that the first state indicates that the first layer is completed at the first fixed-function engine. The processing logic updates the first index to an updated first index. The processing logic receives second dependency information from the second fixed-function engine, which indicates a second dependency condition (e.g., second layer dependency condition) for a second layer to be executed by the second fixed-function engine. The processing logic determines that the second dependency condition is satisfied using the updated first index, the second index, and the third index. The processing logic enables the second fixed-function engine to execute the second layer responsive to the second dependency condition being satisfied. The processing logic receives third dependency information from the third fixed-function engine, which indicates a third dependency condition for a third layer to be executed by the third fixed-function engine. The processing logic determines that the third dependency condition is satisfied using the updated first index, the second index, and the third index. The processing logic enables the third fixed-function engine to execute the third layer responsive to the third dependency condition being satisfied. In at least one embodiment, the second layer and the third layer are executed concurrently. As described herein, the first fixed-function engine and the second fixed-function engine are different engine types. The first fixed-function engine is one of a convolution core, an SDP, a PDP, a CDP, a data reshape engine, or a bridge DMA module. The second fixed-function engine is another one of the convolution core, the SDP, the PDP, the CDP, the data reshape engine, or the BDMA module. In another embodiment, the engines can include CPIPE (a convolution pipeline engine), the data reshape engine (RUBIK), or the BDMA module.

In at least one embodiment, a graph node component prepares dependency information to indicate a kick-off condition for each layer. For example, if there are three engine schedulers (ES) (also referred to herein as collectively as a graph processor), all executed layer identifiers are initialized to −1, meaning there is no dependency required. For each ES, the scheduling algorithm selects a first entry from its respective queue and checks if the kick-off condition is satisfied. If the kick-off condition is satisfied, the ES kicks off the layer and then removes the entry from the queue; otherwise, it is kept in the queue. For example, for a first engine A, layer A1, the dependency information is (A: −1, B: −1, C: −1), which means all conditions should be satisfied (A executed_layer_id>=−1, B executed_layer_id>=−1 and C executed_layer_id>=−1) before enabling layer A1. After layer A1 is initiated, the first engine A will request DMA to fetch a next node for analyzing and after the node is executed by the corresponding fixed-function circuit, a signal is triggered to the corresponding ES, and ES increments its executed layer identifier and broadcasts this event to the other ESes, then the scheduling algorithm transitions to layer A2 and layer B1. When all layers are marked as completed, the ESes (graph processor) can be set to idle. As described herein, approaches that update dependency by accessing system memory increase the latency as the number of layers in a neural network increases. In the embodiments described herein, the latency is decreased and remains constant irrespective of a number of layers in a neural network. This improvement is significant for deep neural networks since the number of layers in these networks can be multiple hundreds of layers (e.g., 600 or more layers, and the number of layers continues to grow).

_FIG. 7 is a block diagram of a DLA system 700, in accordance with at least some embodiments. DLA system 700 is considered a headless system in which unit-by-unit management of a DLA subsystem 702 happens on a main system processor, CPU 704. DLA subsystem 702 includes an interrupt interface 706, a configuration space bus (CSB) interface 708, a primary data bus interface 710 (DBBIF), a secondary data bus interface 712, and the hardware scheduler circuit 102 described above with respect to FIG. 1. The CPU 704 and the DLA subsystem 702 are coupled to system memory 714 (e.g., DRAM). The DLA subsystem 702 is coupled to the system memory 714 via the primary data bus 710. The DLA subsystem 702 can be coupled to a secondary memory, such as SRAM (not illustrated in FIG. 7). It should be noted that the DLA system 700 may not include the optional secondary memory interface 712 as the system memory 714 can consume less power than an SRAM when overall system performance is less of a priority. The DLA system 700 can be more power-efficient to use the system memory 714 as a computation cache.

Figure 7:
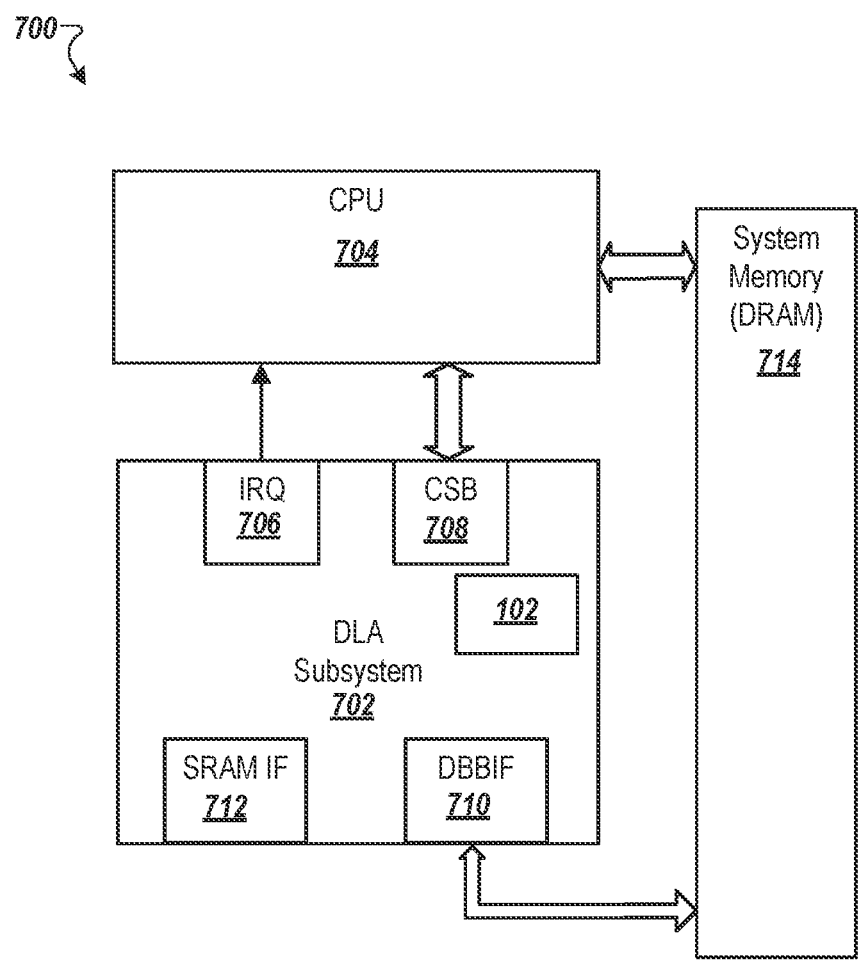
FIG. 7 is a block diagram of a deep learning accelerator (DLA) system, in accordance with at least some embodiments.

DLA system 700 of FIG. 7 represents a more cost-sensitive system than a DLA system with a dedicated controller or coprocessor for unit-by-unit management of the DLA subsystem 702. The DLA system 700 can be considered a small system model. The small system model can be used for cost-sensitive connected Internet of Things (IoT) class devices, artificial intelligence (AI), and automation-oriented systems with well-defined tasks for which cost, area, and power are the primary drivers. Savings in terms of cost, area, and power can be achieved through configurable resources of the DLA subsystem 702. Neural network models can be pre-compiled and their performance can be optimized, allowing larger models to be reduced in the load complexity. In turn, the reduction in load complexity enables a scaled-down DLA implementation where models consume less storage and take less time for system software to load and process. In at least one embodiment, the DLA system 700 can execute one task at a time. Alternatively, the DLA system 700 can execute multiple tasks at a time. For DLA system 700, context switches by DLA system 700 do not result in the CPU 704 being overly burdened by servicing a large number of interrupts from the DLA subsystem 702. This removes the need for an additional microcontroller, and the CPU 704 performs memory allocation and other DLA subsystem management operations. As described herein, the DLA subsystem 702 includes a hardware scheduler circuit 102 for scheduling fixed-function engines and other operations by the CPU 704.

Figure 8:
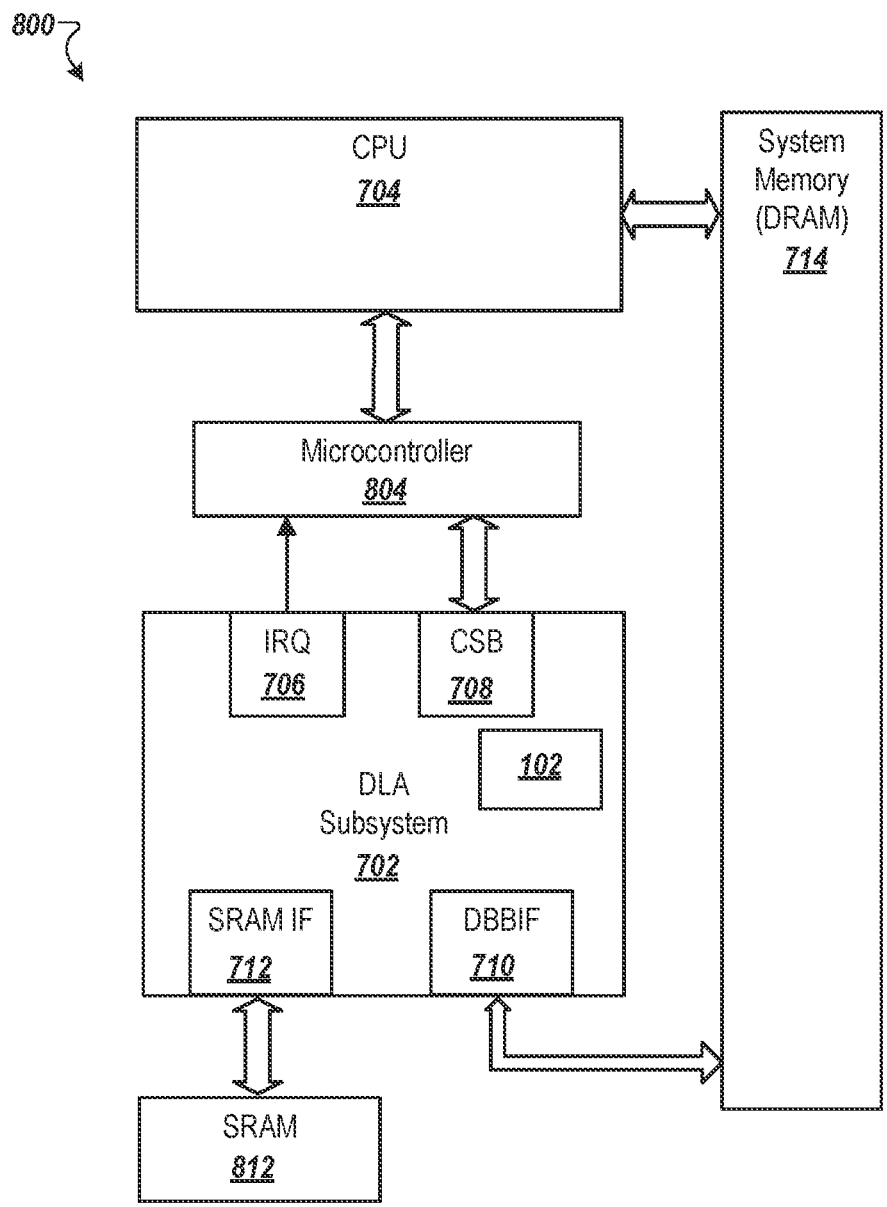
FIG. 8 is a block diagram of a DLA system, in accordance with at least some embodiments.

FIG. 8 is a block diagram of a DLA system 800, in accordance with at least some embodiments. DLA system 800 is considered a headed system in which a main system processor, CPU 802 delegates high-interrupt-frequency tasks to a companion microcontroller 804 coupled to a DLA subsystem 702. DLA system 800 is similar to DLA system 700 as noted by similar reference numbers, except the DLA system 800 includes the companion microcontroller 804. DLA system 800 can be considered a larger system that is characterized by the addition of a dedicated control coprocessor and high-bandwidth SRAM to support the DLA subsystem 702. The larger system model can be used in IoT devices that may run many tasks at once.

In some cases, the larger DLA model in FIG. 8 is used when higher performance and versatility are needed. Performance-oriented IoT systems may perform inference on many different network topologies; thus, they maintain a high degree of flexibility. Additionally, these systems may be performing many tasks at once, rather than serializing inference operations, so inference operations would not consume too much processing power on the CPU 704. To address these needs, the DLA subsystem 702 includes the secondary memory interface 712 that couples to a dedicated high-bandwidth SRAM 812. The SRAM 812 can be used as a cache by the DLA subsystem 702. The SRAM 812 can also be used by other high-performance computer-vision-related components on the system to further reduce traffic to the main system memory 714 (e.g., DRAM). The DLA subsystem 702 enables the interface with the microcontroller 804 (or a dedicated control coprocessor) to limit the interrupt load on the CPU 704. In at least one embodiment, the microcontroller 804 can be a RISC-V-based PicoRV32 processor, an ARM Cortex-M or Cortex-R processors, or other microcontroller designs. Using a dedicated coprocessor (microcontroller 804), the host processor (CPU 704) can handle some tasks associated with managing the DLA subsystem 702. For example, although the hardware scheduler circuit 102 is responsible for scheduling and fine-grained programming of the DLA hardware, the microcontroller 804 or CPU 704 can still handle some coarse-grained scheduling of the DLA hardware, input-output memory management (IOMMU) mappings of DLA memory access, as needed, memory allocation of input data and fixed weight arrays on DLA subsystem 702, and synchronization between other system components and tasks that run on the DLA subsystem 702.

In at least one embodiment, DLA subsystem 702 is programmable into multiple modes of operation, such as an independent mode, a fused mode, or the like. Each functional block can be configured in an independent mode for when and what it executes, with each block working on its assigned task (akin to independent layers in a Deep Learning framework). Independent operations can begin and end with the assigned block performing memory-to-memory operations, in and out of main system memory or dedicated SRAM memory. In a fused mode, some blocks can be assembled as a pipeline. Pipelines can improve performance by bypassing the round trip through memory instead of having blocks communicate with each other through small first-in-first-out (FIFO) queues. For example, the convolution core can pass data to the Single Data Point Processor, which can pass data to the Planar Data Processor and the Cross-channel Data Processor).

The techniques disclosed herein may be incorporated in any processor that may be used for processing a neural network, such as, for example, a central processing unit (CPU), a GPU, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when indicated explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors— for example, a non-transitory computer-readable storage medium store instructions and a main central processing unit ("CPU") executes some of the instructions while a graphics processing unit ("GPU") and/or a data processing unit ("DPU")— potentially in conjunction with a GPU)—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An accelerator circuit comprising:
a plurality of fixed-function circuits, wherein each of the plurality of fixed-function circuits processes a different layer type of a neural network and each of the plurality of fixed-function circuits only processes one layer of a same layer type of the neural network at a time; and
a scheduler circuit coupled to the plurality of fixed-function circuits, wherein the scheduler circuit is to:
store, for each of the plurality of fixed-function circuits, an index identifying a current layer being executed on the respective fixed-function circuit;
determine state information associated with a respective layer being processed by a respective fixed-function circuit;
determine dependency information that indicates a layer dependency condition for the respective layer being processed by the respective fixed-function circuit, the layer dependency condition indicating indexes the respective layer depends on before execution;
determine that a current layer at a first fixed-function circuit of the plurality of fixed-function circuits is programmed using the state information associated with the current layer at the first fixed-function circuit;
determine that the layer dependency condition for the current layer at the first fixed-function circuit is satisfied using the state information associated with other fixed-function circuits of the plurality of fixed-function circuits and the indexes of the other fixed-function circuits; and
enable the first fixed-function circuit to process the current layer at the first fixed-function circuit.

2. The accelerator circuit of claim 1, wherein the scheduler circuit is to:
determine that a current layer at a second fixed-function circuit of the plurality of fixed-function circuits is programmed;
determine that the layer dependency condition for the current layer at the second fixed-function circuit is satisfied using the state information associated with other fixed-function circuits of the plurality of fixed-function circuits and the indexes of the other fixed-function circuits; and
enable the second fixed-function circuit to process the current layer at the second fixed-function circuit.

3. The accelerator circuit of claim 2, wherein the current layer at the first fixed-function circuit and the current layer at the second fixed-function circuit are processed concurrently.

4. The accelerator circuit of claim 1, wherein the scheduler circuit comprises a first engine scheduler circuit comprising:
   a first queue;
   a first direct memory access (DMA) engine to retrieve first information about one or more layers to be processed by the first fixed-function circuit and to store the first information in one or more entries of the first queue, each entry corresponding to a layer to be processed by the first fixed-function circuit; and
   a first controller to select an entry from the first queue associated with the current layer at the first fixed-function circuit, determine that the current layer at the first fixed-function circuit is programmed and the layer dependency condition is satisfied, and enable the first fixed-function circuit responsive to the current layer at the first fixed-function circuit being programmed and the layer dependency condition being satisfied.

5. The accelerator circuit of claim 4, wherein the scheduler circuit comprises a second engine scheduler circuit comprising:
   a second queue;
   a second DMA engine to retrieve second information about one or more layers to be processed by a second fixed-function circuit of the plurality of fixed-function circuits and to store the second information in one or more entries of the second queue, each entry corresponding to a layer to be processed by the second fixed-function circuit; and
   a second controller to select an entry from the second queue associated with the current layer at the second fixed-function circuit, determine that the current layer at the second fixed-function circuit is programmed and the layer dependency condition is satisfied, and enable the second fixed-function circuit responsive to the current layer at the second fixed-function circuit being programmed and the layer dependency condition being satisfied.

6. The accelerator circuit of claim 4, wherein the accelerator circuit is coupled to a microcontroller, wherein the scheduler circuit comprises a second engine scheduler circuit comprising:
   a second queue;
   a second DMA engine to retrieve second information about one or more layers to be processed by the microcontroller and to store the second information in one or more entries of the second queue, each entry corresponding to a layer to be processed by the microcontroller; and
   a second controller to select an entry from the second queue associated with the current layer at the microcontroller, determine that the current layer at the microcontroller is programmed and the layer dependency condition is satisfied, and enable the microcontroller responsive to the current layer at the microcontroller being programmed and the layer dependency condition being satisfied.

7. The accelerator circuit of claim 4, wherein the first controller is a hardware state machine.

8. The accelerator circuit of claim 4, wherein the scheduler circuit further comprises:
   a second engine scheduler circuit;
   a graph processor (GP) controller coupled to the first engine scheduler circuit and the second engine scheduler circuit; and
   an identifier (ID) array coupled to the first engine scheduler circuit and the second engine scheduler circuit.

9. The accelerator circuit of claim 1, wherein the first fixed-function circuit is a convolution core, a single data point processor (SDP), a planar data processor (PDP), a cross-channel data processor (CDP), a data reshape engine, or a bridge direct memory access (BDMA) module.

10. A deep learning accelerator (DLA) core comprising:
    a register file to store configuration information associated with at least a portion of a neural network comprising a plurality of layers;
    a first fixed-function engine to only process a first layer type of the plurality of layers;
    a second fixed-function engine to only process a second layer type of the plurality of layers;
    a third fixed-function engine to only process a third layer type of the plurality of layers; and
    a hardware scheduler circuit coupled to the register file, the first fixed-function engine, the second fixed-function engine, and the third fixed-function engine, wherein the hardware scheduler circuit is to:
       track a first index indicative of a latest layer executed by the first fixed-function engine, a second index indicative of a latest layer executed by the second fixed-function engine, and a third index indicative of a latest layer executed by the third fixed-function engine;
       determine first dependency information that indicates a first dependency condition for a first layer to be executed by the first fixed-function engine, the first dependency condition indicating indexes the first layer depends on before execution;
       determine, using the first, second, and third indexes, that the first dependency condition is satisfied; and
       enable the first fixed-function engine to execute the first layer responsive to the first dependency condition being satisfied.

11. The DLA core of claim 10, wherein the hardware scheduler circuit is further to:
    determine a first state of the first layer to be processed by the first fixed-function engine; and
    determine that the first state indicates that the first layer is programmed at the first fixed-function engine, wherein the first fixed-function engine is enabled responsive to the first dependency condition being satisfied and responsive to the first state indicating that the first layer is programmed.

12. The DLA core of claim 10, wherein the hardware scheduler circuit is further to:
    determine a first state of the first layer;
    determine that the first state indicates that the first layer is completed at the first fixed-function engine;
    update the first index to an updated first index;
    determine second dependency information that indicates a second dependency condition for a second layer to be executed by the second fixed-function engine;
    determine, using the updated first index, the second index, and the third index, that the second dependency condition is satisfied; and
    enable the second fixed-function engine to execute the second layer responsive to the second dependency condition being satisfied.

13. The DLA core of claim 12, wherein the hardware scheduler circuit is further to:
   determine third dependency information that indicates a third dependency condition for a third layer to be executed by the first fixed-function engine;
   determine, using the updated first index, the second index, and the third index, that the third dependency condition is satisfied; and
   enable the first fixed-function engine to execute the third layer responsive to the third dependency condition being satisfied, wherein the second layer and the third layer are executed concurrently.

14. The DLA core of claim 12, wherein the hardware scheduler circuit is further to:
   determine a first state of the first layer;
   determine that the first state indicates that the first layer is completed at the first fixed-function engine;
   update the first index to an updated first index;
   determine second dependency information that indicates a second dependency condition for a second layer to be executed by the second fixed-function engine;
   determine, using the updated first index, the second index, and the third index, that the second dependency condition is satisfied;
   enable the second fixed-function engine to execute the second layer responsive to the second dependency condition being satisfied;
   determine third dependency information that indicates a third dependency condition for a third layer to be executed by the third fixed-function engine;
   determine, using the updated first index, the second index, and the third index, that the third dependency condition is satisfied; and
   enable the third fixed-function engine to execute the third layer responsive to the third dependency condition being satisfied, wherein the second layer and the third layer are executed concurrently.

15. The DLA core of claim 10, wherein the first fixed-function engine and the second fixed-function engine are different engine types, and wherein the first fixed-function engine is one of a convolution core, a single data point processor (SDP), a planar data processor (PDP), a cross-channel data processor (CDP), a data reshape engine, or a bridge direct memory access (BDMA) module, wherein the second fixed-function engine is another one of the convolution core, the SDP, the PDP, the CDP, the data reshape engine, or the BDMA module.

16. A method comprising:
   tracking, by a hardware scheduler circuit of an accelerator circuit, a first index indicative of a latest layer of a neural network executed by a first fixed-function engine of the accelerator circuit, a second index indicative of a latest layer of the neural network executed by a second fixed-function engine of the accelerator circuit, and a third index indicative of a latest layer of the neural network executed by a third fixed-function engine of the accelerator circuit, wherein the first, second, and third fixed-function engines are different engine types, wherein each of the first, second, and third fixed-function engines only processes one layer of a same layer type of the neural network at a time;
   determine first dependency information that indicates a first dependency condition for a first layer to be executed by the first fixed-function engine, the first dependency condition indicating indexes the first layer depends on before execution;
   determining, using the first, second, and third indexes, that the first dependency condition is satisfied; and
   enabling the first fixed-function engine to execute the first layer responsive to the first dependency condition being satisfied.

17. The method of claim 16, further comprising:
   determine a first state of the first layer to be processed by the first fixed-function engine; and
   determining that the first state indicates that the first layer is programmed at the first fixed-function engine, wherein the first fixed-function engine is enabled responsive to the first dependency condition being satisfied and responsive to the first state indicating that the first layer is programmed.

18. The method of claim 16, further comprising:
   determine a first state of the first layer;
   determining that the first state indicates that the first layer is completed at the first fixed-function engine;
   updating the first index to an updated first index;
   determine second dependency information that indicates a second dependency condition for a second layer to be executed by the second fixed-function engine;
   determining, using the updated first index, the second index, and the third index, that the second dependency condition is satisfied; and
   enabling the second fixed-function engine to execute the second layer responsive to the second dependency condition being satisfied.

19. The method of claim 18, further comprising
   determine third dependency information that indicates a third dependency condition for a third layer to be executed by the first fixed-function engine;
   determining, using the updated first index, the second index, and the third index, that the third dependency condition is satisfied; and
   enabling the first fixed-function engine to execute the third layer responsive to the third dependency condition being satisfied, wherein the second layer and the third layer are executed concurrently.

20. The method of claim 18, further comprising:
   determine a first state of the first layer;
   determining that the first state indicates that the first layer is completed at the first fixed-function engine;
   updating the first index to an updated first index;
   determine second dependency information that indicates a second dependency condition for a second layer to be executed by the second fixed-function engine;
   determining, using the updated first index, the second index, and the third index, that the second dependency condition is satisfied;
   enabling the second fixed-function engine to execute the second layer responsive to the second dependency condition being satisfied;
   determine third dependency information that indicates a third dependency condition for a third layer to be executed by the third fixed-function engine;
   determining, using the updated first index, the second index, and the third index, that the third dependency condition is satisfied; and
   enabling the third fixed-function engine to execute the third layer responsive to the third dependency condition being satisfied, wherein the second layer and the third layer are executed concurrently.

21. The method of claim 16, and wherein the first fixed-function engine is one of a convolution core, a single data point processor (SDP), a planar data processor (PDP), a cross-channel data processor (CDP), a data reshape engine, or a bridge direct memory access (BDMA) module, wherein the second fixed-function engine is another one of the convolution core, the SDP, the PDP, the CDP, the data reshape engine, or the BDMA module.

22. An accelerator circuit comprising:
- a plurality of fixed-function circuits, wherein each of the plurality of fixed-function circuits processes a different layer type of a neural network; and
- a scheduler circuit coupled to the plurality of fixed-function circuits, wherein the scheduler circuit is to:
  - determine state information associated with a respective layer being processed by a respective fixed-function circuit;
  - determine dependency information that indicates a layer dependency condition for the respective layer being processed by the respective fixed-function circuit, wherein the scheduler circuit further comprises a first engine scheduler circuit comprising:
    - a first queue;
    - a first direct memory access (DMA) engine to retrieve first information about one or more layers to be processed by a first fixed-function circuit of the plurality of fixed-function circuits and to store the first information in one or more entries of the first queue, each entry corresponding to a layer to be processed by the first fixed-function circuit; and
    - a first controller to select an entry from the first queue associated with a current layer at the first fixed-function circuit, determine that the current layer at the first fixed-function circuit is programmed and the layer dependency condition for the current layer at the first fixed-function circuit is satisfied using the state information and the dependency information, and enable the first fixed-function circuit to process the current layer at the first fixed-function circuit responsive to the current layer at the first fixed-function circuit being programmed and the layer dependency condition being satisfied.

23. The accelerator circuit of claim 22, wherein the scheduler circuit comprises a second engine scheduler circuit comprising:
- a second queue;
- a second DMA engine to retrieve second information about one or more layers to be processed by a second fixed-function circuit of the plurality of fixed-function circuits and to store the second information in one or more entries of the second queue, each entry corresponding to a layer to be processed by the second fixed-function circuit; and
- a second controller to select an entry from the second queue associated with the current layer at the second fixed-function circuit, determine that the current layer at the second fixed-function circuit is programmed and the layer dependency condition is satisfied, and enable the second fixed-function circuit responsive to the current layer at the second fixed-function circuit being programmed and the layer dependency condition being satisfied.

* * * * *